US007669328B1

(12) United States Patent
Wake

(10) Patent No.: US 7,669,328 B1
(45) Date of Patent: Mar. 2, 2010

(54) METHOD OF MANUFACTURING A PUSH ROD

(75) Inventor: Masato Wake, South Bend, IN (US)

(73) Assignee: Robert Bosch GmbH, Stuttgart (DE)

( * ) Notice: Subject to any disclaimer, the term of this patent is extended or adjusted under 35 U.S.C. 154(b) by 970 days.

(21) Appl. No.: 11/379,703

(22) Filed: Apr. 21, 2006

(51) Int. Cl.
*B21C 37/12* (2006.01)
*B21D 21/00* (2006.01)
*B21D 22/00* (2006.01)
*B21D 39/08* (2006.01)
*B23K 31/00* (2006.01)
*B23P 11/02* (2006.01)
*F16L 13/14* (2006.01)

(52) U.S. Cl. .......................... 29/890.053; 29/890.054; 29/507; 72/49; 72/370.06; 72/370.08; 72/370.1; 72/370.11; 72/358

(58) Field of Classification Search .................. 29/507, 29/888.2, 890.053, 890.054; 72/49, 58, 358, 72/370.06–370.08, 370.13; 285/382.4–382.5; 74/512; 91/369.1
See application file for complete search history.

(56) References Cited

U.S. PATENT DOCUMENTS

| | | | | |
|---|---|---|---|---|
| 3,538,574 A | * | 11/1970 | Nishiyama et al. | 29/888.2 |
| 3,754,429 A | * | 8/1973 | Creuzet | 72/342.4 |
| 4,850,095 A | * | 7/1989 | Akao et al. | 29/447 |
| 5,607,194 A | * | 3/1997 | Ridenour | 285/334.5 |
| 5,761,983 A | | 6/1998 | Gotoh et al. | |
| 6,260,401 B1 | * | 7/2001 | Tada | 72/370.06 |
| 6,694,615 B2 | * | 2/2004 | Mickelson | 29/888.06 |
| 6,896,337 B1 | | 5/2005 | Backhus et al. | |
| 6,959,637 B1 | | 11/2005 | Penninger et al. | |

* cited by examiner

*Primary Examiner*—David P Bryant
*Assistant Examiner*—Alexander P Taousakis
(74) *Attorney, Agent, or Firm*—Maginot, Moore & Beck

(57) ABSTRACT

A method of manufacturing a push rod from a length of tube having a first end and a second end. The tube is held in a first fixture and a first tool is brought into engagement with the first end while a force is applied to deform the first end into a cone. A disc is thereafter affixed to the cone through a welding process. The tube with the disc attached is moved to a second fixture and a threaded shaft is partially inserted into the tube adjacent the second end. A radial force is applied to the tube that causes the tube to be compressed into engagement with the threaded shaft. The threaded shaft is then rotated causing its translation within the tube to establish a desired length between a face on the disc and a head on the threaded shaft to complete the manufacture of the push rod.

4 Claims, 2 Drawing Sheets

METHOD OF MANUFACTURING A PUSH ROD

This invention relates to a method of manufacturing a push rod for a brake booster through a sequential stamping process of a tubular member.

BACKGROUND OF THE INVENTION

In brake boosters of which U.S. Pat. Nos. 6,959,637, 6,896,337 and 5,761,983 are considered to be typical have an output push rod through which an operational force is transmitted to a master cylinder to effect a brake application. The output push rod is a solid shaft with a threaded adjustment screw attached thereto to set a desired spaceial relationship between pistons in the master control and movable wall in the brake booster to coordinate the actuation of the master cylinder with the input from a brake pedal to effect a brake application.

The output push rods function in an adequate manner in such brake booster but do require certain processing in their manufacture and because of being cast from as a solid member may weigh more than is necessary in order to transmit a braking force from the booster to a piston in a master cylinder.

SUMMARY OF THE INVENTION

The present invention provides a method of making a push rod by initially deforming a first end of a tubular member into a cone for accepting a disc and later compressing a second end of the tubular member into engagement with a threaded shaft such that the shaft is thereafter rotated to establish a desire length between a face on the disc and a head on the shaft to complete the manufacture of the push rod.

In more particular detail, the push rod is manufactured through the following steps:

a length of tube is obtained from a source that has a first end and a second end;

the tube is placed and holds in a first fixture;

a first tool is brought into engagement with the first end while applying an axial force thereto that causes the first end to radial expand and define a cone;

a second tool is brought into engagement with the first end and a flat surface that is perpendicular to the axis of the tube is formed on the base of the cone;

a disc is obtained from a source that has a diameter that corresponds to the base of the cone and affixing the flat surface by a welding process;

the tube with the disc attached thereto is placed in a second fixture;

a threaded shaft is obtained from a source;

a portion of the threaded shaft is inserted into the tube adjacent the second end and aligned along the axis of the tube;

a radial force is applied to the tube adjacent the second end to compress the tube into engagement with that portion of the threaded shaft located within the tube; and the threaded shaft is thereafter rotated with respect to the second end to cause the threaded shaft to translated with respect to the compressed portion of the tube until a desired length is established between a face on the disc and a semi-spherical head on the threaded shaft to complete the manufacture of the push rod.

An advantage of the invention resides in a push rod that is manufactured by deforming a tube into a load bearing shaft through which an output force may be transmitted from a movable wall into a master cylinder.

An object of the present invention resides in providing a method of manufacturing a push rod through a stamping process involving a tubular member.

DETAILED DESCRIPTION

In the specification where similar components are used the component may be identified by a number or a same number plus depending on a relationship with other components.

Figure 1:
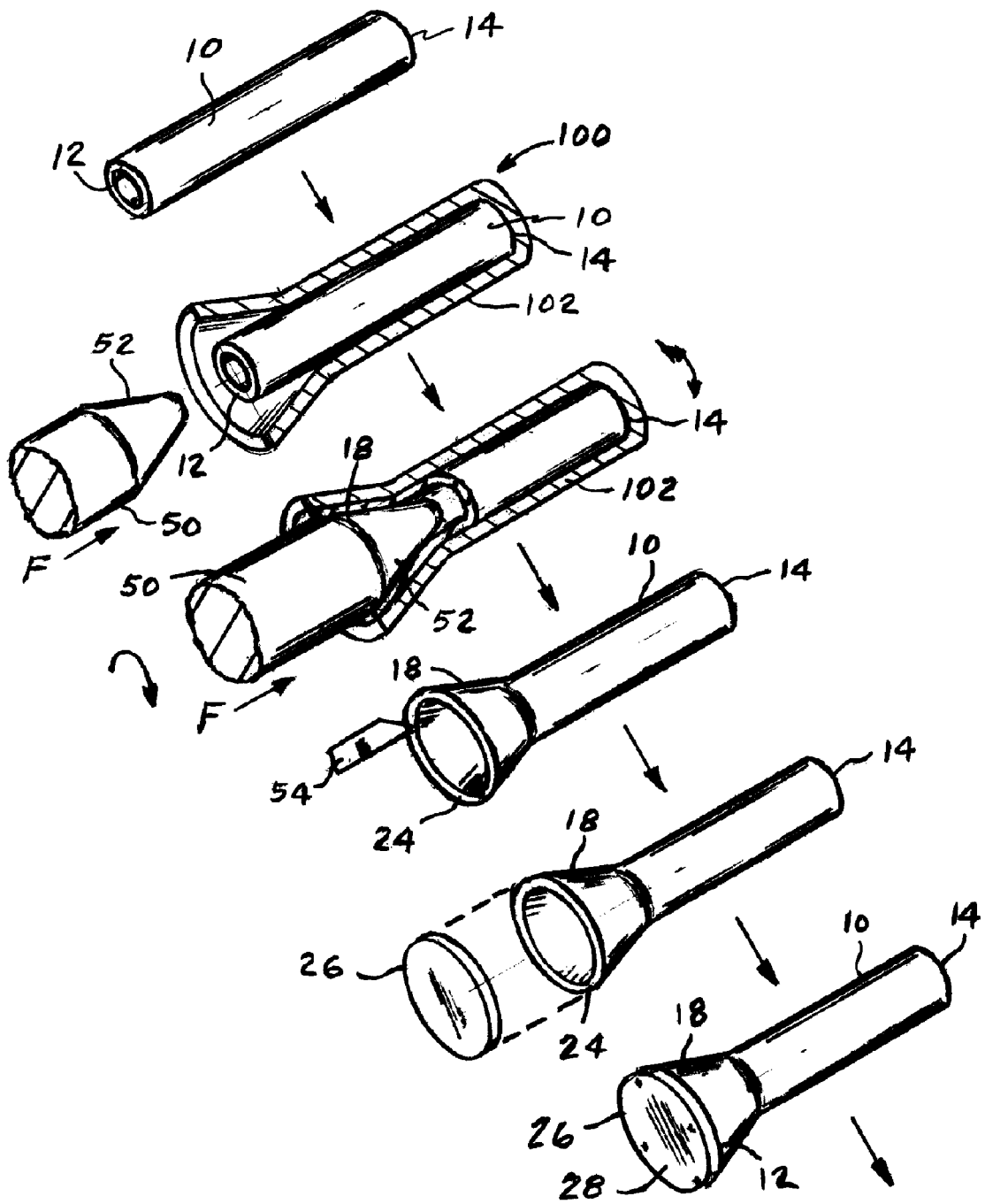
FIG. 1 illustrates sequential progression of forming a first end of a tubular member in the manufacture of a push rod according to the present invention.

In this invention, a hollow tube 10 as illustrated in FIG. 1 is obtained from a source. The tube 10 has a uniform diameter for its entire length between a first end 12 and a second end 14. The tube 10 is transported to a fixture 100 and placed in a die 102 therein. A first tool 50 having a tapered head 52 thereon is aligned with the axis of the tube 10 and a force is applied to move the tool 50 toward and into engagement with the tube 10 causing the first end 12 to be radially expanded into the shape of a cone 18. The tool 50 or fixture 100 may be rotated during movement of the head 52 toward the first end 12 to assist in the complete deformation of the tube 10 into the cone shape as set by of the die 102. Once the shape of the cone 18 has been achieved, a second tool 54 is brought into engagement with the base 24 of cone 18 to form a flat surface that is perpendicular with the axis of the tube 10.

A disc 26 having a diameter equal to the base 24 of cone 18 is selected from a source and is affixed to the base 24 through a welding process such as orbital welding or induction welding. The disc 26 is designed to uniformly transmit a force applied to its face 28 into the tube 10 by way of the cone 18 without the introduction of any side leading on the tube 10. This completes the steps in the stamping operation on the first end 12.

Figure 2:
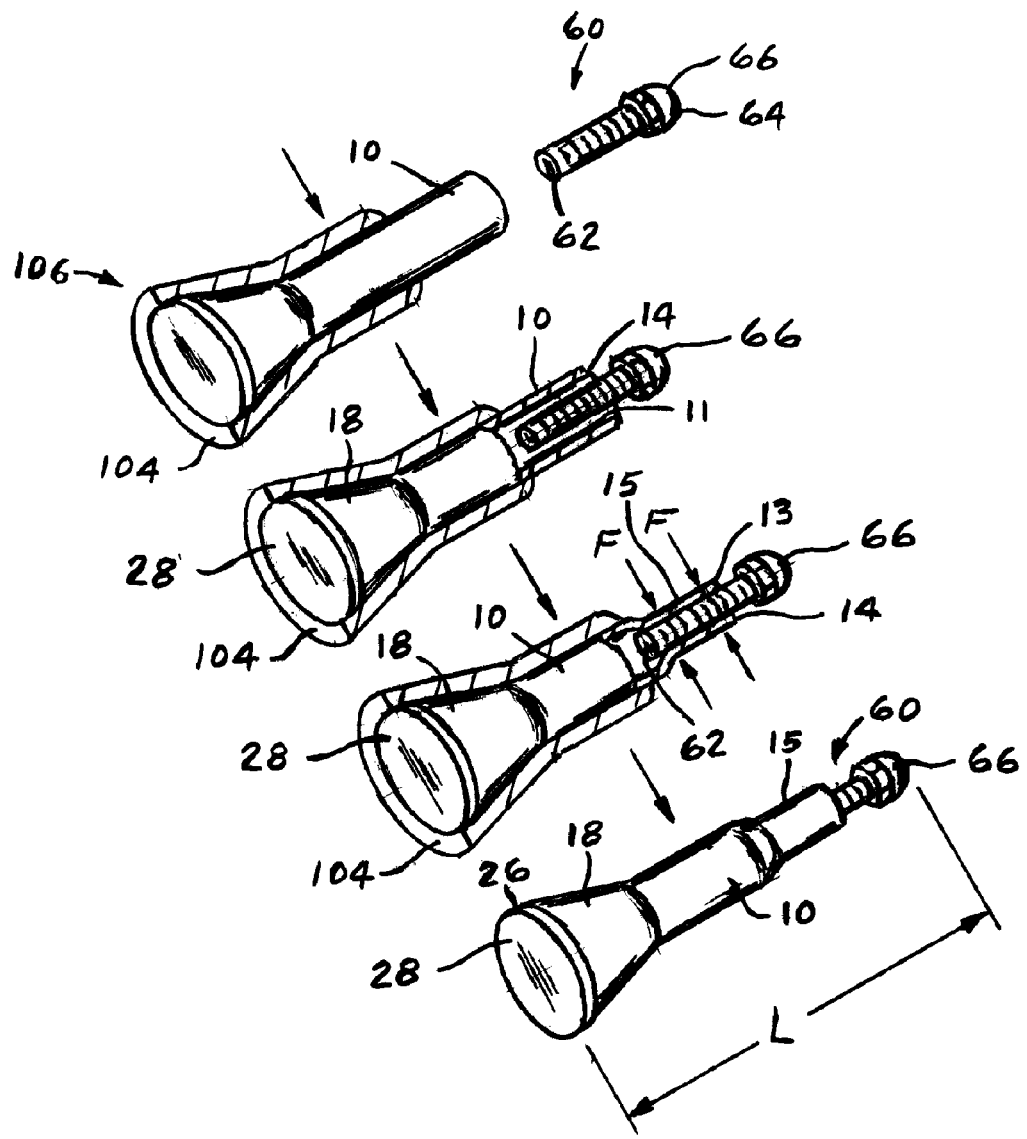
FIG. 2 illustrates sequential progression of forming a second end of the tubular member to complete the manufacture of the push rod.

The tube 10 with the disc 26 attached thereto is now transferred to a die 104 in a second fixture 106 as illustrated in FIG. 2 and a threaded shaft 60 is obtained from a source. The threaded shaft 60 is defined by threads that extend from a first end 62 to a head 66 on the second end 64. The head 66 has a semi-spherical surface thereon for transmitting force into a piston in a master cylinder.

The threaded shaft 60 is aligned with the axis of tube 10 and a portion thereof inserted into bore 11 from the second end 14. The threaded shaft 60 is held stationary and a radial force F is applied to portion 15 of tube 10 adjacent the second end 14 causing the tube 10 to be compressed around the threaded shaft 60 and form stamped threads 13 therein.

The tube 10 is removed from die 104 and the head 66 rotated while tube 10 is held stationary. The threaded shaft 60 is translated along the treads 13 such that a desired length L is set between face 28 and the semi-spherical surface on head 66 to complete the manufacture of the push rod.

What is claimed is:

1. A method of manufacturing a push rod comprising the steps of:

obtaining a length of tube from a source having a first end and a second end;

placing and holding the length of tube in a first fixture;

bringing a first tool into engagement with the first end while applying an axial force causing the first end to radially expand and define a cone on the first end of the tube;

bringing a second tool into engagement with the first end of the tube to form a flat surface that is perpendicular to the axis of the tube;

obtaining a disc from a source having a diameter that corresponds to the diameter of the cone on the first end of the tube;

affixing the disc to the flat surface on the first end of the tube;

placing and holding the tube with the disc attached thereto in a second fixture;

obtaining a threaded shaft from a source;

moving a portion of the threaded shaft into the tube adjacent the second end along the axis of the tube;

applying a radial force to the tube adjacent the second end to compress the tube into engagement with that portion of the threaded shaft located within the tube; and thereafter, rotating the threaded shaft with respect to the second end causing the threaded shaft to translate with respect to the compressed portion of the tube to establish a desired length between a face on the disc and a semi-spherical head on the threaded shaft to complete the manufacture of the push rod.

2. The method as recited in claim 1 wherein the first tool is rotated to enhance the development of the cone on the first end of the tube.

3. The method as recited in claim 2 wherein said disc is affixed to the flat surface through welding.

4. The method as recited in claim 3 wherein said disc is affixed to the flat surface through orbital welding.

* * * * *